United States Patent [19]
Hewko

[11] 3,892,134
[45] July 1, 1975

[54] SPEEDOMETER DRIVE ARRANGEMENT

[75] Inventor: Lubomyr O. Hewko, Port Clinton, Ohio

[73] Assignee: General Motors Corporation, Detroit, Mich.

[22] Filed: June 13, 1974

[21] Appl. No.: 478,840

[52] U.S. Cl. .......................... 74/12; 74/198; 74/798
[51] Int. Cl. ... F16h 37/00; F16h 15/08; F16h 13/06
[58] Field of Search ...................... 74/12, 198, 798

[56] References Cited
UNITED STATES PATENTS
3,097,539   7/1963   Opocensky .................. 74/198
3,727,473   4/1973   Bayer .......................... 74/198

Primary Examiner—Leonard H. Gerin
Attorney, Agent, or Firm—John P. Moran

[57] ABSTRACT

A continuously variable speedometer drive arrangement including a traction drive-ball or barrel confined in a preloaded manner between the transmission output shaft and a disc of a planetary unit associated with the speedometer take-off shaft, wherein the radius from the take-off shaft axis to the center of the drive-ball or barrel may be changed via manual linear adjustment means.

4 Claims, 5 Drawing Figures

SPEEDOMETER DRIVE ARRANGEMENT

This invention relates generally to automotive speedometer drive arrangements and, more particularly, to a continuously variable drive means therefor.

Generally, automotive speedometers are driven from the transmission output shaft by a pair of crossed-axis gears and a flexible cable. Because a pair of gears has only one finite drive ratio, it is necessary to use different gears for each of countless combinations of tire sizes and axle ratios, with the attendant production and service difficulties of having to maintain a large gear inventory. Additionally, because of normal tire wear and dimensional tolerances of tire diameters, the resultant speed indicated by a conventional speedometer, can be in error.

Currently, drive ratio adjustment is not generally available, and yet speedometer accuracy requirements are becoming increasingly more stringent and, hence, extremely difficult to maintain over the life time of an automobile.

Accordingly, a general object of the invention is to provide an improved speedometer drive arrangement wherein initial and periodic adjustment of the transmission output shaft to speedometer take-off shaft speed ratio is readily and accurately accomplished.

Another object of the invention is to provide an improved infinitely or continuously variable speedometer drive arrangement which is frictionally driven by the transmission output shaft and permits adjustment of the speed ratio between the transmission output shaft and the speedometer power take-off shaft, particularly during final test of the automobile on a roll dynamometer, for example, at the end of an assembly line. Thus, the speed ratio would be adjusted for the exact axle ratio and tire size as installed in the specific vehicle. The accuracy of speed indication thus established could be maintained during the life of the automobile through periodic adjustments of the inventive continuously variable drive arrangement.

A further object of the invention is to provide a continuously variable traction-drive arrangement operatively connected to the transmission output shaft for driving a speedometer take-off shaft, wherein the speed ratio of the transmission output shaft and speedometer take-off shaft may be varied by a simple linear adjustment operation.

Still another object of the invention is to provide a speedometer take-off housing slidably mounted on a transmission extension housing and having an off-set opening formed therein, with the speedometer take-off shaft rotatably mounted in the off-set opening, and a drive-ball or barrel mounted in a traction-drive or frictional drive relationship between the transmission output shaft and a planetary arrangement operatively connected to a flange formed on the end of the take-off shaft, the resultant speed ratio being variable by manually moving the speedometer take-off housing linearly to thereby vary the distance or radius between the axis of the take-off shaft and the center of the drive-ball as required for an accurate reading on the speedometer for various tire size and axle ratio combinations.

These and other objects and advantages of the invention will be apparent when reference is made to the following description and accompanying drawings, wherein.

Figure 1:
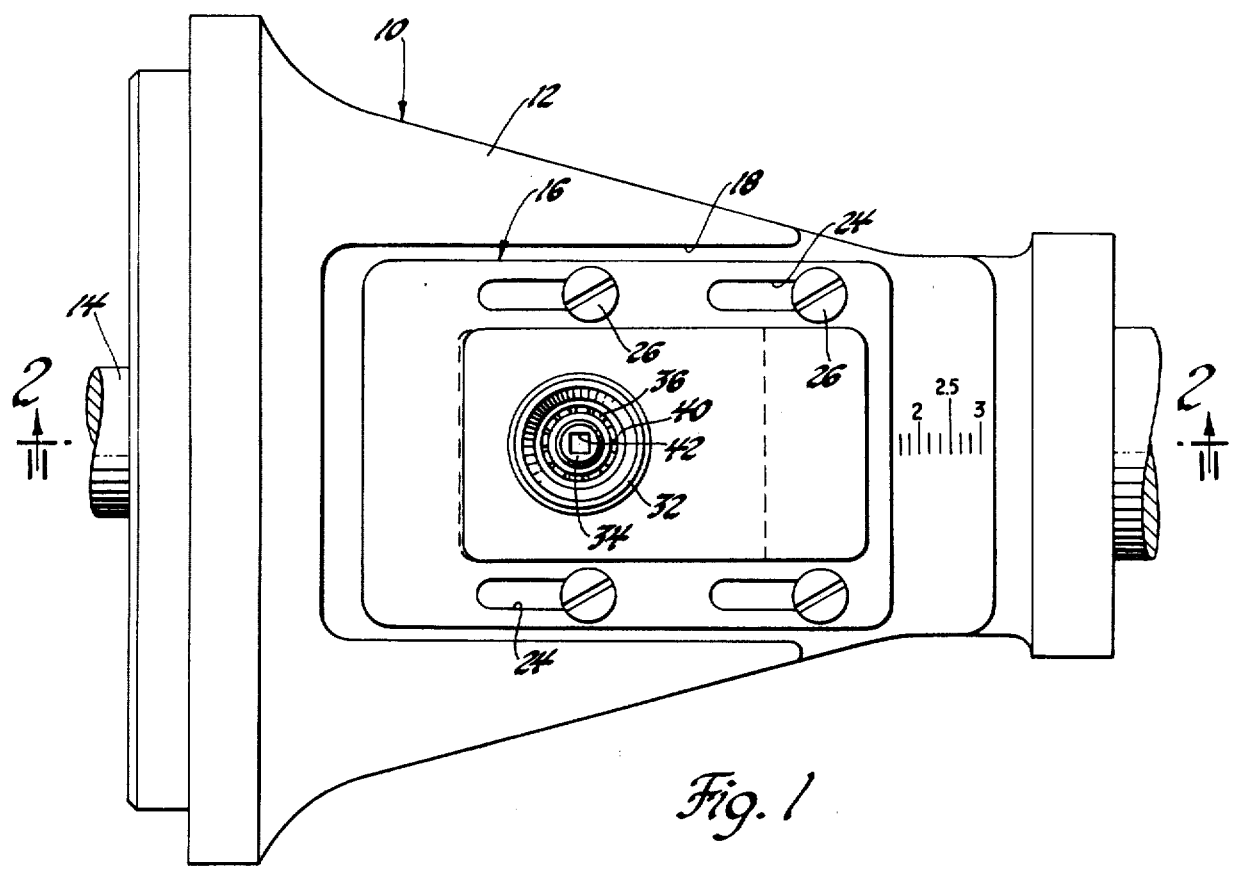
FIG. 1 is a fragmentary top view of an automotive transmission case embodying the invention.
Figure 2:
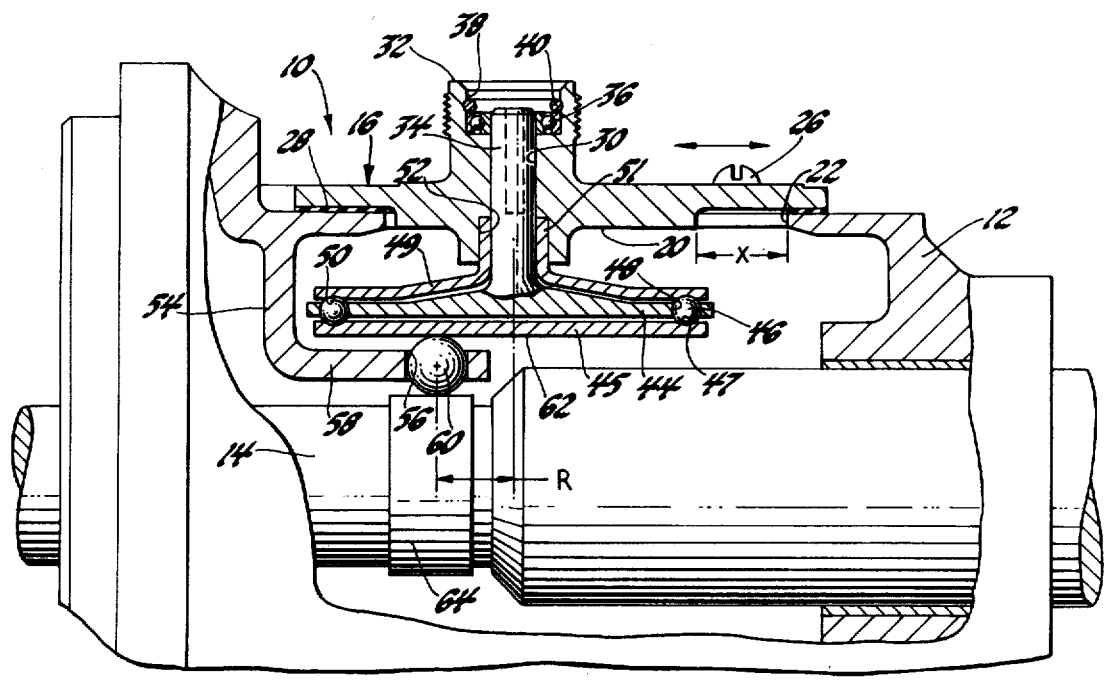
FIG. 2 is a cross-sectional view taken along the plane of line 2—2 of FIG. 1, and looking in the direction of the arrows.

Referring now to the drawings in greater detail, FIGS. 1 and 2 illustrate a speedometer drive arrangement 10, adapted to being mounted in a vehicular transmission extension housing or case 12 for use with a transmission output shaft 14.

The speedometer drive arrangement 10 includes a housing 16 mounted in an open-ended longitudinal slot 18 (FIG. 1) formed on the transmission extension housing or case 12, the slot 18 being a predetermined amount wider than the housing 16. A rectangular guide member 20 is formed on the inner surface of the housing 16 for mounting in a rectangular slot 22 formed in the extension housing 12. The width of the guide member 20 is such that it just clears the width of the slot 22 for a slidable relationship therewith, while the length of the guide member 20 is a predetermined amount, i.e., the distance designated by the letter X in FIG. 2, shorter than the length of the slot 22. A plurality of slots 24 (FIG. 1) are formed in the housing 16 with a plurality of suitable screws or bolts 26 mounted therethrough and being threadedly connected to the extension housing 12. A gasket 28 prevents leakage of transmission fluid from between the transmission case 12 and the speedometer drive housing 16.

A speedometer take-off shaft opening 30 is formed through an extension 32 formed on the housing 16, off-set a predetermined amount from the longitudinal center of the guide member 20. A shaft 34, such as a speedometer take-off shaft, is mounted through the off-center opening 30, and is rotatably supported by a sealed bearing 36 mounted in a counterbore 38 formed in the housing 16 at the exposed end of the opening 30. The bearing 36 is retained axially by a retainer ring 40. Suitable fitting means, such as a square or hexagonal opening 42, is formed in the exposed end of the take-off shaft 34 for the connection therewith of a conventional speedometer cable [not shown].

A flange 44 of a predetermined diameter is formed on the end of the take-off shaft 34 within the transmission case 12. A disc 45 is freely mounted around the end of the shaft 34, adjacent the flange 44, with a plurality of balls 46 mounted in an annular groove 47 formed in the disc 45. The balls 46 are also confined in spaced slots 48 formed around the outer periphery of the flange 44. A contoured resilient wall 49 is formed to include an annular groove 50 serving as a track for the balls 46, with a sleeve-like extension 51 being formed at the center of the wall 49 and secured in a counterbore 52 formed in the housing 16 at the inner end of the opening 30. Thus it may be realized that the disc 45, the balls 46, the flange 44, and the wall 49 serve as a ring, planets, a carrier, and reaction sun, respectively of a planetary unit which provides a 2:1 speed reduction between the input at the ring 45 and the output at the carrier 44 at the latter's associated output shaft 34.

A reaction member 54 is formed on the transmission case 12 adjacent an end of the rectangular slot 22. An opening 56, formed in an axially extending portion 58 of the reaction member 54, serves as a socket for operatively retaining a traction drive-ball 60 between the adjacent outer surface 62 of the disc or ring 45 and the transmission output shaft 14 at a predetermined peripheral surface 64 thereof.

Operation

The traction drive-ball 60 is preloaded with respect to the peripheral surface 64 of the transmission output shaft 14 by virtue of the resilient wall 49 being sprung upwardly when mounted on the ball planets 46, once the speedometer drive housing 16 is lowered into the slot 18. The preloaded drive-ball 60 is thus frictionally confined for rotation between the surfaces 62 and 64 while retained in the socket or opening 56 formed in the extension 58 of the reaction member 54.

The speed ratio of the rotary speed of the transmission output shaft 14 and that of the speedometer take-off shaft 34 is dependent upon the distance or radius between the axis of the shaft 34 and the center of the drive-ball 60, i.e., the distance designated by the letter R in FIG. 2. Such distance R, and hence, the resultant speed ratio of the transmission 10, as required for particular combinations of tire sizes and axle ratios, is variable between predetermined limits by loosening the screws 26 and manually sliding the housing 16 and the guide member 20 in the respective slots 18 and 22, thereby moving the axis of the take-off shaft 34 with respect to the fixed center of the traction drive-ball 60. Inasmuch as the longitudinal slot 18 is wider than the housing 16, lateral adjustment may be made therebetween to assure that the take-off shaft 34 remains axially aligned with the center of the drive-ball 60 and the axis of the transmission output shaft 14.

It has been determined that substantially all current axle-ratio tire-size combinations could be compensated for if the adjustment features assure a speed ratio range of from 1.8:1 to 3.5:1 speed reduction, and such range is readily attainable with the inventive drive arrangement described above when the variable radius R function is combined with the 2:1 speed reduction available from the above-described planetary arrangement.

Figure 3:
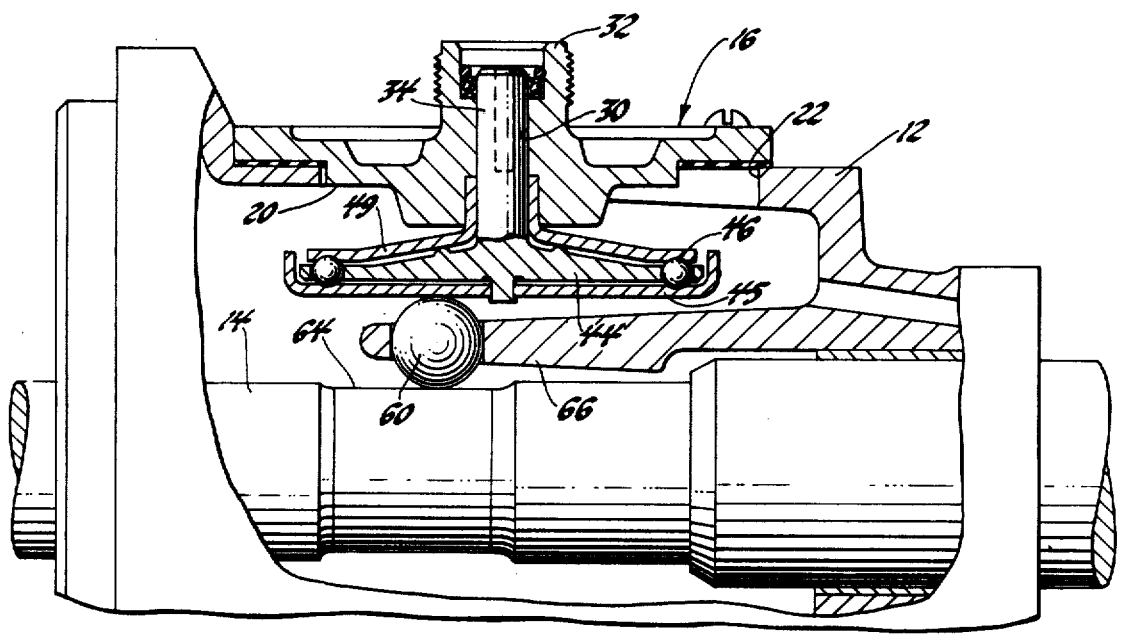
FIG. 3 is a fragmentary cross-sectional view of an automotive transmission case embodying a modification of a portion of the FIG. 2 structure.

The reaction member 54 for supporting the drive-ball 60 may be formed as an integral portion of the transmission case 12, either as shown in FIG. 2, or as shown in FIG. 3, and identified therein as 66, or it may be a separate member secured in any suitable manner to the transmission case 12 adjacent an edge of the rectangular slot 22.

It is apparent that adjustment of the speed ratio is accomplished by loosening the bolts 26, sliding the housing 16 and its guide member 20 linearly through the distance X, as required for the particular vehicle involved, and retightening the bolts 26 in the slots 24, thereby varying the radius R discussed above with respect to FIG. 2.

Figure 4:
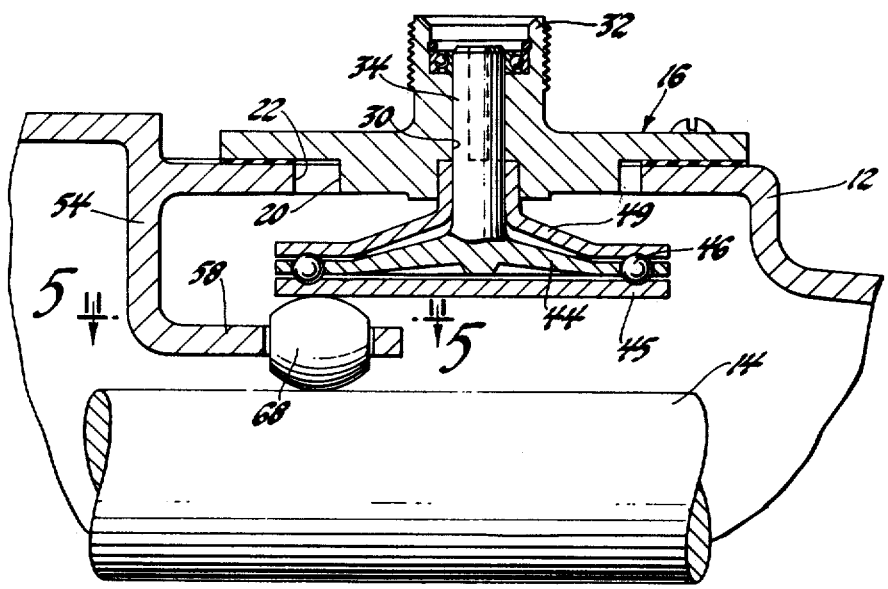
FIG. 4 is a fragmentary cross-sectional view of an automotive transmission case embodying a second modification of a portion of the FIG. 2 structure.
Figure 5:
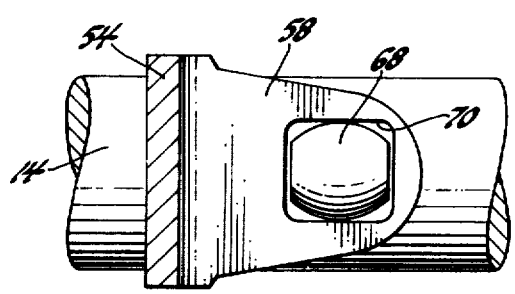
FIG. 5 is a fragmentary cross-sectional view taken along the plane of line 5—5 of FIG. 4, and looking in the direction of the arrows.

If desired, a barrel roller 68, shown in FIGS. 4 and 5, may be substituted for the drive-ball 60 of FIGS. 2 and 3. As noted in FIG. 5, the barrel roller 68 is confined in a rectangular opening 70 formed in the axially extending portion 58 of the reaction member 54.

It should be apparent that the invention provides an improved continuously variable speedometer drive arrangement wherein conventional gears and resultant gear noise have been eliminated and wherein adjustment may be readily and accurately accomplished to compensate for various axle-ratio tire-size combinations, or for subsequent tire wear or size changes.

While but one general embodiment of the invention has been shown and described, other modifictions thereof are possible.

I claim:

1. A continuously variable speedometer drive arrangement comprising a transmission extension housing, a transmission output shaft extending through said extension housing, a rectangular opening formed in a side of said extension housing, a speedometer drive housing slidably mounted on said extension housing, rectangular guide means formed on said speedometer drive housing and mounted in said rectangular opening, said guide means being a predetermined amount shorter than said rectangular opening, fastener means for securing said speedometer drive housing on said extension housing, a speedometer take-off shaft opening formed through said drive housing, a speedometer take-off shaft rotatably mounted in said take-off shaft opening, a belleville spring-type planetary unit operatively connected to said speedometer take-off shaft, a reaction member connected to said extension housing, and a drive-member rotatably mounted on said reaction member and maintained by said belleville spring-type planetary unit in a driving relationship intermediate said transmission output shaft and said speedometer take-off shaft, the distance between the center of said drive-member and the axis of said take-off shaft being variable in response to manual linear movement of said guide means in said rectangular opening in said extension housing.

2. A continuously variable speedometer drive arrangement comprising a transmission extension housing, a transmission output shaft extending through said extension housing, a rectangular opening formed in a side of said extension housing, a speedometer drive housing slidably mounted on said extension housing, rectangular guide means formed on said speedometer drive housing and mounted in said rectangular opening, said guide means being a predetermined amount shorter than said rectangular opening, fastener means for securing said speedometer drive housing on said extension housing, a speedometer take-off shaft opening formed through said drive housing off-set from the center thereof, a speedometer take-off shaft rotatably mounted in said take-off shaft opening, a flange formed on an end of said take-off shaft within said extension housing, a belleville spring-type race and planet assembly operatively connected to said flange, a reaction member connected to said extension housing, and a drive-member rotatably mounted on said reaction member and maintained by said belleville spring-type race and planet assembly in a driving relationship intermediate said transmission output shaft and said speedometer take-off shaft, the distance between the center of said drive-member and the axis of said take-off shaft being variable in response to manual linear movement of said guide means in said rectangular opening in said extension housing.

3. A continuously variable speedometer drive arrangement comprising a transmission extension housing, a transmission output shaft extending through said extension housing, a rectangular opening formed in a side of said extension housing, a speedometer drive housing slidably mounted on said extension housing, a rectangular guide means formed on said speedometer drive housing and mounted in said rectangular opening, said guide means being a predetermined amount shorter than said rectangular opening, fastener means for securing said speedometer drive housing on said extension housing, a speedometer take-off shaft opening formed through said drive housing, a speedometer take-off shaft rotatably mounted in said take-off shaft opening, a flange-type carrier formed on an end of said take-off shaft within said extension housing, a plurality of planets rotatably mounted in said carrier, a belleville spring-type upper race and a rigid bottom race mounted respectively above and below said planets, a reaction member connected to said extension housing, and a drive-ball rotatably mounted on said reaction member and maintained by said belleville spring-type upper race in a traction-drive relationship between said transmission output shaft and said rigid bottom race, the distance between the center of said drive-ball and the axis of said take-off shaft being variable in response to manual linear movement of said guide means in said rectangular opening in said extension housing.

4. A continuously variable speedometer drive arrangement comprising a transmission extension housing, a transmission output shaft extending through said extension housing, a rectangular opening formed in a side of said extension housing, a speedometer drive housing slidably mounted on said extension housing, a rectangular guide means formed on said speedometer drive housing and mounted in said rectangular opening, said guide means being a predetermined amount shorter than said rectangular opening, fastener means for securing said speedometer drive housing on said extension housing, a speedometer take-off shaft opening formed through said drive housing, a speedometer take-off shaft rotatably mounted in said take-off shaft opening, a flange-type carrier formed on an end of said take-off shaft within said extension housing, a plurality of planets rotatably mounted in said carrier, a belleville spring-type upper race and a rigid bottom race mounted respectively above and below said planets, a reaction member connected to said extension housing, and a drive-barrel rotatably mounted on said reaction member and maintained by said belleville spring-type upper race in a traction-drive relationship between said transmission output shaft and said rigid bottom race, the distance between the center of said drive-barrel and the axis of said take-off shaft being variable in response to manual linear movement of said guide means in said rectangular opening in said extension housing.

* * * * *